ABSTRACT OF THE DISCLOSURE

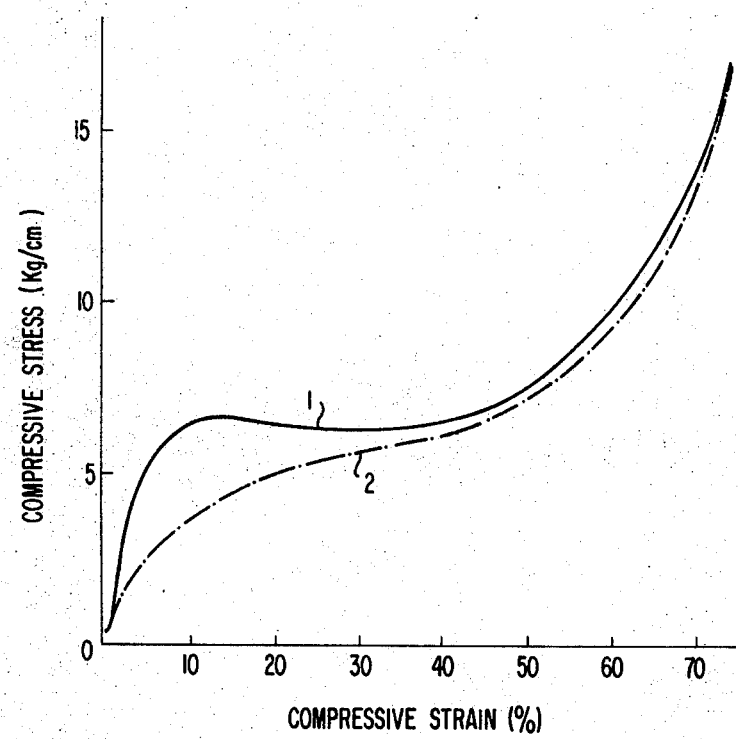
COMPRESSIVE CURVE OF POLYPROPYLENE 3,542,702
METHOD OF MAKING CROSS-LINKED POLYPROPYLENE RESIN FOAMS
Hiroshi Okada, Isamu Tamai, Atsushi Osakada, Minoru Oyama, Masaaki Yamada, and Shunji Ohkubo, Ohtsushi, Japan, assignors to Toray Industries Inc., Tokyo, Japan
Filed Dec. 28, 1967, Ser. No. 694,157
Int. Cl. C08j 1/18; C08f 47/10; C08d 13/10
U.S. Cl. 260—2.5          17 Claims

The formation of a polypropylene resin foam having uniform and fine cells therein by utilizing as a base a polypropylene resin cross-linked with from 0.05–20% by weight of divinylbenzene.

BACKGROUND OF INVENTION

The present invention relates to a polypropylene resin foam having uniform and fine cells therein and also a method of preparing such a polypropylene resin foam.

Recently, there have been proposed various foamed products comprising olefinic polymers and, among them, a polyethylene foam has been employed widely.

As compared with polyethylene foams, polypropylene resin foams have excellent high-temperature resistance as well as desirable mechanical properties such as tensile strength and hardness. Also, the polypropylene resin foam has excellent tensile strength and bending strength properties as compared with a hard polystyrene foam. Accordingly, polypropylene resin foams are highly desirable.

Among conventionally employed methods of preparing polypropylene resin foams, there may be mentioned: (1) a method wherein a mixture of polypropylene and a foaming agent is subjected to extrusion foaming as shown in Japanese Patent Publication No. 7483/63; (2) a method wherein polypropylene is cross-linked using an azide compound and thereafter foamed as shown in Japanese patent publications Nos. 29208/64, 29209/64, 29210/64, 25351/65 and 25352/65; and (3) a method wherein polypropylene is cross-linked by irradiation with high energy rays or by the decomposition of an organic peroxide, and thereafter foamed as shown in Japanese Patent Publication Nos. 24131/64, 25072/65 and 8840/64.

However, polypropylene resin foams prepared without preliminary cross-linking as in method (1) above, do not have a sufficiently large viscosity for retaining gases generated by a foaming agent therein, and hence, a foamed product having a low density cannot be obtained. Therefore, in order to obtain a polypropylene resin foam with a low density, polypropylene must be subjected to cross-linking reaction until the viscosity of the melt becomes sufficiently large for retaining in the melt the gases formed by a foaming agent as in the case of preparing polyethylene foams. Thus, as in aforesaid method (3), there is a cross-linking action produced by the decomposition of an organic peroxide or by the irradiation of high energy rays such as electron rays. However, differently from polyethylene, polypropylene resin does not undergo cross-linking by applying the means shown in method (3) and therefore a foamed product with a low density is not obtained. Further, while some cross-linking may occur partially in polypropylene resin by irradiation with electron rays, the polypropylene resin is decomposed vigorously.

Accordingly to method (2) polypropylene resin is cross-linked using as a cross-linking agent an azide compound and polypropylene resin foam with a low density can be obtained. However, since the azide compound used in this method is very unstable chemically and is explosive, there is trouble in handling or operating with these compounds. Moreover, the preparation of azide compounds is generally difficult. The compounds cannot be obtained easily, which makes the overall method unprofitable. Furthermore, the foamed product prepared by these methods is inferior in heat resistance and weather-proof properties.

Thus, where it is desired to prepare a foamed product from polypropylene resin with a low density, it is necessary that the cross-linking reaction be conducted sufficiently, and with a high reaction rate and that the reaction be operated easily.

The inventors have studied various methods for obtaining polypropylene resin foam with a low density. It has been found that the aforesaid requirements have been satisfied by the present invention as explained below.

BRIEF DESCRIPTION OF INVENTION

The present invention relates to a polypropylene resin foam comprising a polypropylene resin prepared by cross-linking polypropylene with 0.05–20% by weight of divinylbenzene.

The polypropylene resin foam of this invention is a closed-cellular resin containing fine foam cells of 10–800 in average diameter and having a density of 0.5–0.01 g./cm.$^3$.

In this case, it is undesirable that the average foam cell diameter exceed 800 $\mu$ since the mechanical properties such as tensile strength and compressive strength are reduced. Also, when the density of the polypropylene resin foam is in 0.5–0.01 g./cm.$^3$, the resin foam exhibits remarkably good properties such as heat-insulating or shock absorbing materials.

DETAILED DESCRIPTION OF INVENTION

As the polypropylene resin to be used for preparing the foam resin, there may preferably be used a polypropylene resin having a good sterospecific property and prepared generally using a Ziegler type catalyst. However, a copolymer thereof with a small proportion of other material may also be used.

For example, there may be used as the raw material in this invention a copolymer of propylene and ethylene, butene-1, 4-methyl-pentene-1, etc. In this case, the copolymerization ratio is usually preferably less than 50% by weight.

As the polypropylene resin used in this invention, there is most preferably used a polypropylene having an isotacticity of at least 60%, preferably 90% (the weight percent of the components insoluble in n-heptane boiled under a normal pressure) and having an intrinsic viscosity of 0.5–15.0 in tetralin at 135° C. Furthermore, the polypropylene resin may be incorporated with less than the equivalent amount of quality-controlling components or additives. As quality-controlling components, there may be mentioned polyethylene, ethylene-propylene copolymer, polybutadiene rubber, styrene-butadiene copolymer rubber, natural rubber, butyl rubber, polyisoprene rubber, polystyrene, acylo-nitrile-butadiene-styrene (ABS) resin and the like. As additives, there may be mentioned pigments, extenders, flame-resisting agents and the like.

In order to obtain the polypropylene resin foam of this invention, the aforesaid polypropylene resin must be cross-linked by divinylbenzene.

The differences between the mechanical properties of the polypropylene resin foam obtained by using an azide compound as the cross-linking agent and the polypropylene resin foam in which divinylbenzene is used as the cross-linking agent are shown in Table 1.

TABLE 1

| | Method | Polypropylene resin foam using an azide compound | Polypropylene resin foam using divinyl-benzene |
|---|---|---|---|
| Apparent density | ASTM 1622-63 | 0.071 | 0.070 |
| Foam diameter (μ) | | [1] 80-120 | 80-100 |
| Tensile strength (kg./cm.²) | ASTM S 1564-62T | 15.2 | 18.0 |
| Tear strength (kg./cm.²) | JIS K6781-65 | 2.3 | 4.3 |
| Compressive strength (kg./cm.²) | ASTM D 1667-59T | 3.0 | 3.8 |
| Compressive permanent stress (percent) | ASTM D 1667-59T | 10.1 | 11.2 |
| Repulsive elasticity (percent) | ASTM D 1564-62T | 17.0 | 22.0 |
| Compressive curve | ASTM D 1667-59T | [2] | [3] |

[1] Unevenness of foams.
[2] Curve 1 (Fig.).
[3] Curve 2 (Fig.).

It must be understood that polypropylene resin is cross-linked by other cross-linking agents, for example, by azide compounds. By using cross-linking agents other than divinylbenzene, however, the polypropylene resin is not uniformly cross-linked and hence a good resin foam cannot be prepared. Also, cross-linking agents other than divinylbenzene are used and the foam thus formed is extremely discolored, i.e. yellow, which is undesirable.

Moreover, a polypropylene resin foam obtained by cross-linking with an azide compound is inferior in heat resistance as compared with one obtained by cross-linking with divinylbenzene. The reason for this is that when an azide compound such as sulfone azide or azidoformate is used as the cross-linking agent, the $-SO_2NH-$ bond or

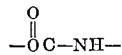

bonds in the cross-linking bond tend to be cut by heating, which also causes discoloration. On the other hand, as the cross-linking bonds produced by divinylbenzene are composed of only saturated hydrocarbons, the foam has an excellent heat resistance and no discoloration occurs in the foam.

Furthermore, there is a difference in weatherproof properties between the polypropylene resin foam prepared by cross-linking with an azide compound followed by foaming and the polypropylene resin foam prepared by cross-linking with divinylbenzene followed by foaming as shown by the results of the following tests. These results show that the $-SO_2NH$ bond or the

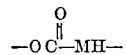

bond in the cross-linking bonds have bad influences on the heat resistances of the products. Also there are substantial differences between the properties of the polypropylene resin foam prepared by this invention and by using an azide compound as a cross-linking agent.

Results of testing heat resistance and weatherproof properties:

Heat resistance (dimensional change after heating for 1 hr. at 150° C.)

The polypropylene resin foam using an azide compound was changed −20% in length and −25% in width while the polypropylene resin foam using divinylbenzene was changed −5% in length and −8% in width.

Weatherproof (after exposing to weather test for 75 hrs.)

The polypropylene resin foam using an azide compound was colored faint brown while the polypropylene resin foam using divinylbenzene was not discolored.

The mechanical properties of the polypropylene resin foam in which an azide compound is used as the cross- The figure in the accompanying drawing shows compressive curves showing a relation between the comprehensive strain and the compressive stress of polypropylene foam in which Curve 1 stands for a polypropylene foam of this invention and Curve 2 stands for a polypropylene foam using an azide compound as a foaming agent.

As is clear from the table, the polypropylene resin foam of the invention is excellent in tensile strength, tear strength, respulsive elasticity, and compression curve as the properties of resin foam as compared with the polypropylene resin foam using an azide compound as a cross-linking agent.

The excellence of the polypropylene resin foam of the invention in these properties is due to the fact that the polypropylene resin foams of the invention have foam cells having uniform diameters and the above results show that the cross-linking agents have great influences on the properties of the polypropylene resin foam prepared.

The differences caused by using an azide compound and divinylbenzene, respectively, as the cross-linking agent will be explained below.

First of all, divinylbenzene has a strong plasticizing action on polypropylene. The use of divinylbenzene makes possible the employment of a low kneading temperature. For instance, in the case of preparing a polypropylene resin foam by mixing polypropylene resin with azodicarbonamide which is considered to be a most preferable foaming compound for preparing polypropylene resin foams, a part of the azodicarbonamide is foamed during kneading when using an extruder or a roll as the melting temperature of azide- cross-linked polypropylene is 175–177° C. On the other hand, when divinylbenzene is used as the cross-linking agent, a mixture of polypropylene resin, a foaming agent, and the cross-linking agent can be kneaded by means of an extruder or a roll at a temperature of about 5–10° C. lower than the temperature in the case of using an azide compound as the cross-linking agent without the attendant decomposition of the foaming agent. Accordingly, the use of divinylbenzene as the cross-linking agent provides polypropylene resin foam having uniform and fine foam cells.

Moreover, since the extrusion or rolling temperature when using an azide compound is 5–10° C. higher than when using divinylbenzene as the cross-linking agent, the cross-linking reaction proceeds further. Therefore, there is a strong tendency for the polypropylene resin to be further cross-linked during extrusion or rolling, which reduces the kneading effect of a foaming agent and a cross-linking agent and further causes unevenness in the resultant foams. Thus, the polypropylene resin foam prepared using an azide compound has, in general, uneven foam characteristics. However, such unevenness of foams is not observed in the case of using divinylbenzene.

Furthermore, the amount of divinylbenzene is also an important factor. That is, it is necessary in this invention that the polypropylene resin used as a base material be cross-linked with 0.05–20% by weight based on the weight of the polypropylene resin of divinylbenzene. If divinylbenzene of less than 0.05% by weight of the polypropylene resin is used, the cross-linking necessary for the foaming of polypropylene is not obtained. Moreover, the cross-linking will not be conducted uniformly, which makes it possible to prepare polypropylene resin foam with a low density.

If a polypropylene resin cross-linked with an amount of divinylbenzene less than 0.05% by weight is used, a polypropylene resin foam having good foam cells cannot be obtained and the polypropylene resin foam thus prepared exhibits only the properties similar to those of conventionally foamed products. On the other hand, if divinylbenzene of higher than 20% by weight is used, the polypropylene resin foam having good foam cells cannot be obtained. Moreover, the mechanical properties of the foamed products are reduced.

The above will be illustrated as follows. In the following experiments, A and B are examples of using less than 0.05% by weight divinylbenzene, while C is an example of using more than 20% by weight divinylbenzene.

EXPERIMENT A

A mixture of 100 parts by weight of powdered polypropylene having an isotacticity of 95 and an intrinsic viscosity of 2.50, 0.04 part by weight of divinylbenzene, and 0.3 part by weight of dicumylperoxide was uniformly mixed in a mixer and molded into a sheet of about 2 mm. in thickness by means of a press mold heated to 190° C. to effect a simultaneous cross-linking reaction. When the sheet thus obtained was heated in silicone oil heated to 220–230° C., the sheet was melted showing that the sheet could not retain the gases generated. Hence, polypropylene resin foam with a low density could not be obtained.

EXPERIMENT B

A mixture of 100 parts by weight of powdered polypropylene having an isotacticity of 95, 5 parts by weight of azodicarbonamide, 0.04 part by weight of divinylbenzene, and 0.3 part by weight of dicumyl peroxide was uniformly mixed in a mixed and heated for 4 minutes to 220–230° C. in a closed vessel under a pressure of about 200 kg./sq. cm. Thereafter, when the pressure was suddenly reduced to a normal pressure, the polypropylene was scattered off in small pieces. Thus, it was confirmed that the polypropylene was not cross-linked sufficiently and hence in the case where the amount of divinylbenzene was less than 0.5 parts by weight, a polypropylene resin foam with a low density was not obtained.

EXPERIMENT C

A mixture of 100 parts by weight of powdered polypropylene having an isotacticity of 95 and an intrinsic viscosity of 2.50, 10 parts by weight of azodicarbonamide, 30 parts by weight of divinylbenzene, and 1 part by weight of dicumyl peroxide was mixed uniformly in a mixer and heated for 3 minutes to 220° C. under a pressure of 200 kg./sq. cm. in a closed vessel. Thereafter, when the pressure in the mold was reduced suddenly to a normal pressure, the polypropylene was foamed but the surface of the foamed product was extremely rough and the apparent specific gravity of the product was 0.125 which was far lower than the forecasted value. Thus, a polypropylene resin foam with a low density was not obtained.

In addition, the use of pure divinylbenzene having a purity of about 100% as the cross-linking agent is not always necessary in the practice of the present invention and a mixture thereof with an aromatic compound such as benzene toluene, diethylbenzene and ethyl vinylbenzene may be used.

As cross-linking reactions between polypropylene and divinylbenzene for obtaining the polypropylene resin foam of the invention, there are methods in which an organic radical forming agent is employed and a method in which high energy rays are employed. Either of them may be preferably used in the present invention.

As the organic radical forming agent may be mentioned organic peroxides, azo compounds and disulfide compounds and among them the organic peroxides are particularly preferable. Those wherein the temperature at which a half value period of the decomposition is one minute higher than about 120° C. can be used. That is, when divinylbenzene is used together with an organic peroxide, the decomposition temperature of the organic peroxide is fairly reduced, as compared with the case of employing the organic peroxide alone. For example, t-butylhydroperoxide (the temperature at which the half value period is one minute is 250–260° C.) may be effectively used in this invention. Other peroxides useful are benzoyl peroxide, methyl-ethylketone peroxide, cyclohexanone peroxide, t-butyl-peroxyisopropanol carbonate, di-ti-butyl disperterephthalate, 2,5-dimethyl-2, 5-bis (benzoyl - peroxy) hexane, dicumyl peroxide, 2,5 - dimethyl-2, 5-bis (t-butylperoxy) hexane, 2, 5-dimethyl-2, 5-bis (t-butylperoxy) hexene-3, t-butylhydroperoxide, and cumenhydroperoxide. In particular, 2, 5-dimethyl-2, 5-bis (benzoyl-peroxy) hexane, dicumyl peroxide, methyl-ethylketone peroxide, 2,5-dimethyl-2, 5-bis (t-butylperoxy) hexane, and 2,5-dimethyl-2, 5-di (t-butylperoxy) hexene-3 are preferably used.

In addition to these organic peroxides, there may be employed as the radical forming agent azo compounds such as azo-bisisobutylonitrile and disulfide compounds such as tetramethyl thiuram disulfide. The amount of the radical forming agent is 0.01–10% by weight, preferably 0.05–1.0% by weight based on the weight of polypropylene. If less than 0.01% by weight of the radical forming agent is used, the cross-linking reaction does not occur sufficiently and hence the polypropylene cannot sufficiently retain the gases formed by the decomposition and expansion of the foaming agent. The foam cells of the product thus obtained are uneven, and the density is very high. Also, if the amount of the radical forming agent is higher than 10% by weight, the product obtained becomes brittle. Furthermore, the use of larger amounts of the radical forming agent causes discoloration and unevenness of foams. In order to prevent discoloration and unevenness of foams, the amount of the radical forming agent is made as small as possible.

As high energy rays for foaming, there may be mentioned electron rays from an electron accelerator 60, radioactive rays such as alpha rays, gamma rays and beta rays from radioactive isotopes (60 Co., etc.), X-rays and ultraviolet rays. In this case, the irradiation amount is 0.5–50 M rad., preferably 1–20 M rad.

As the foaming agent used in this invention, there may be employed a chemical foaming agent which generates gases by the decomposition thereof and an organic inflating agent which is liquid at a normal temperature but converted into gases by heating. In particular, the use of a chemical foaming agent having a decomposition temperature of higher than 140° C. and an organic inflating agent having a boiling point of higher than 50° C. is preferable. Typical examples of the chemical foaming agent are dinitropentamethylene tetramine, p,p'-xybis (benzenesulfonylhydrazide), hydrozodicarbonamide, azodicarbonamide, barium azodicarboxylate, toluene sulfonylhydroxide, bisbenzenesulfonylhydrazide, diazoaminobenzene and the like. The typical examples of the organic inflating agent are chloroform, tetrachloromethane, trichlorotrifluoroethane, dichlorotetrafluoroethane, tetrachloroethylene, tetrachloroethane, trichloroethylene and dichloroethylene.

If a chemical foaming agent having a decomposition temperature of less than 140° C. or an organic inflating agent having a low boiling point is used, gases are generated or expanded before the cross-linking of the polypropylene sufficiently occurs and hence the polypropylene cannot retain therein a sufficient proportion of gases.

The amount of the foaming agent is generally 0.1–30% by weight based on the weight of the polypropylene used. But the amount may be varied desirably according to the kind thereof and the desired density.

The mixture of polypropylene, the foaming agent and divinylbenzene in the present invention may be accomplished by any mixing method in the case of conducting the cross-linking reaction by irradiation with high energy rays. In particular, there may be effectively employed a mixing by means of a Henscher mixer, Banbury mixer, mixing roll, and extruder, and a method in which a polypropylene resin is immersed in a solution containing a foaming agent and a cross-linking agent, and a combination thereof.

In the case of conducting the cross-linking reaction by the decomposition of the radical forming agent, it is necessary to mix the radical forming agent with the mixture mentioned above. However, the cross-linking reaction tends to occur in polypropylene to a high extent where the polypropylene is molten. Hence, it is preferable to mix the mixture by any conventional manner in a state in which neither decomposition of the foaming agent nor the cross-linking reaction occurs or in a state in which no decomposition of foaming agent occurs and the bridging reaction occurs insignificantly. For example, a method may be employed in which polypropylene, preferably powdered polypropylene, a foaming agent, divinylbenzene and a radical forming agent are subjected to dry mixing. By "dry mixing" is meant a mixing of polypropylene in a solid state. The case where a liquid foaming agent, a radical forming agent and divinylbenzene are mixed with the polypropylene is also included by the term dry mixing."

In the case of employing irradiation with high energy rays, the cross-linking reaction is conducted at a temperature of from room temperature to the softening point of the polypropylene.

In the case of conducting the cross-linking reaction by the radical forming agent, the reaction is usually conducted at a temperature of from the softening point of the polymer to 350° C., preferably from 200 to 300° C. That is, if the cross-linking reaction of polypropylene is carried out at a temperature lower than the softening point of the polymer, the cross-linking cannot be conducted uniformly and sufficiently and the rate of cross-linking is low, such that a polypropylene resin foam with a low density cannot be obtained. Therefore, when the mixing mentioned above is conducted at a temperature lower than the softening point of the polymer, the polymer is not foamed at a normal pressure. Further, it is necessary to conduct the cross-linking reaction uniformly and sufficiently at a temperature of from the softening point of the polymer to 350° C., preferably 200–300° C., whereby a good resin foam is obtained. Also, in the case of carrying out the cross-linking reaction at a temperature higher than 350° C., the decomposition reaction of polymer is promoted and hence such a case is not preferred.

In addition, in the case of conducting the cross-linking reaction at a temperature of from the softening point of the polymer to 350° C., the reaction may be conducted at a normal pressure or under pressure but when the decomposition or volatilization of the foaming agent occurs under the cross-linking conditions, a method may preferably be employed in which the mixture is heated in a closed vessel under pressure and then the pressure is released and at the same time the mixture is foamed. Also, in the case where a mixture of powdered polypropylene, the foaming agent, divinylbenzene, and the radical forming agent is subjected to the cross-linking reaction in one step at a temperature of from the softening point of the polymer to 350° C. without kneading the mixture at a temperature lower than the softening point, the reaction may be conducted under pressure and if the foaming agent is decomposed or volatilized under these conditions, after heating the system for a period of time necessary for decomposing and volatilizing the foaming agent, the pressure may be suddenly released to cause foaming simultaneously. Or if the foaming agent is not decomposed under the conditions, the mixture may be molded into a sheet and the sheet may be foamed at a sufficient temperature for decomposing and volatilizing the foaming agent under a normal pressure or may be foamed under pressure.

In particular, in order to obtain a fine-cellular polypropylene resin foam having uniform cells, a method may be preferably employed in which the cross-linking reaction is carried out under pressure at a temperature of from the softening point of the polymer to 350° C. and also at a temperature higher than the decomposition and volatilization temperature of the foaming agent, and the pressure is released to cause simultaneous foaming. The period of time for conducting the cross-linking reaction at a temperature of from the softening point of the polymer to 350° C., preferably 200–300° C., depends upon the temperature, the amounts of divinylbenzene and the radical forming agent, and the thickness of the polypropylene mixture to be foamed but preferably is 0.5–20 minutes. In the case of decomposing or volatilizing the foaming agent, simultaneously, the period of time necessary for decomposing the foaming agent is longer. Furthermore, in the case of conducting cross-linking and foaming under pressure, the pressure is generally lower than 2000 kg./sq. cm., preferably 10–300 kg./sq. cm. As mentioned before, the cross-linking reaction is conducted at the temperature of from the softening point of polypropylene resin to 350° C. in this invention, since it is necessary for obtaining uniform and high to reduce the viscosity of molten polypropylene to some extent and increase the reactivity of divinylbenzene.

In addition, by softening point of polymer is meant a temperature at which the polymer is soft and becomes fluid by heating. The softening temperature of polypropylene varies over a wide range depending upon the polymerization degree and the composition of polypropylene to be employed and the presence of a plasticizer, but usually is in a range of 140–180° C.

In any cross-linking reactions as mentioned above, the polymer is endowed by the cross-linking reaction with a sufficient strength necessary for retention therein of the gases formed by the decomposition or volatilization of the foaming agent. That is, the degree of cross-linking of the polymer in this case is 5–90%, preferably 20–80%. In addition, by "the degree of cross-linking" is meant the amount by percent by weight of insoluble components of the polymer when 0.2 g. of the sample is immersed for 3 hours in 50 ml. of tetralin at 135° C.

If the degree of cross-linking is less than 5%, a resin foam having uniform fine foam cells cannot be obtained, while if it is higher than 90%, the fabrication of the polymer becomes difficult.

By heating the polymer thus cross-linked, the foaming agent is decomposed or volatilized to provide a foamed product and in this case, the foaming temperature is of course higher than the softening point of the polymer to be cross-linked and also higher than the decomposition or volatilization temperature of the foaming agent. In practice, the foaming temperature is preferably 200–260° C. The foaming operation may be conducted under a reduced pressure, at a normal pressure, or under a high pressure, and in the case of conducting the cross-linking reaction by the radical forming agent, the cross-linking reaction may be conducted together with foaming.

As the heating means, there may be employed, according to the shapes of the materials to be heated and the pressure at foaming, heating by steam, heating by infrared rays, heating in a polyethylene glycol bath, heating in a silicone oil bath, heating in a nitrate bath, heating in a bath of a mixture of salts having low melting points, heating in a bath of an easily melting alloy, heating by infrared rays on a heating bath, and heating in a metallic mold capable of being closed or pressed by steam, hot blast, or electric heating.

In the case of conducting the foaming procedure under a pressure lower than a normal pressure, it is preferable to use as the foaming agent a chemical foaming agent having a definite decomposition temperature and a definite gas-generating capacity. In other words, it is preferable to use the chemical foaming agent at least 60% of which is decomposed at a temperature of 180–220° C. and the whole gas-generating capacity of which is at least 150 cc. per one gram of the foaming agent.

EXAMPLE 1

A mixture of 100 parts by weight of powdered polypropylene (softening point 175° C. and the intrinsic viscosity thereof in tetralin at 135° C. was 3.15) having an isotacticity (weight percent of the insoluble component in boiling n-heptane at normal pressure) of 95, 10 parts by weight of barium azodicarbonamide, 0.8 part by weight of dicumyl peroxide, and 1.0 part by weight of divinylbenzene was heated for about 5 minutes on a press heated to 185–190° C., under a pressure of about 150 kg./sq. cm. to provide a non-foamed crosslinked polymer sheet, which was foamed by placing in a salt bath heated to 250° C. The foamed material thus obtained was white and had uniform cell (about 200µ), and the apparent specific gravity thereof was 0.076. In addition, the degree of crosslinking of the non-foamed crosslinked polymer sheet (weight percent of insoluble components of the sheet when heated for 3 hours to 135° C. in tetralin) was 70.2.

Furthermore, for confirming the merit of the above process of this invention, the following comparative experiment was conducted.

That is, a non-foamed crosslinked polymer sheet was prepared using the same composition while varying the crosslinking conditions under pressure to about 170° C. in crosslinking temperature and 10 minutes in crosslinking time and foamed by placing in the same salt bath. In this case, however, gases formed by the decomposition of the foaming agent flew off vigorously and the cell sizes of the foams were uneven. The degree of crosslinking of the non-foamed crosslinked polymer sheet was 22.5.

Thus, it will be understood that if the crosslinked reaction is not conducted in the reaction conditions or the reaction temperature range shown in the process of this invention, a polypropylene resin foam having a low density cannot be obtained.

EXAMPLE 2

On a roll heated to 180° C., was melted 100 parts by weight of a polypropylene chip (having an intrinsic viscosity of 2.50 and softening point of 175° C.) having an isotacticity of 95, and after the addition of 10 parts by weight of azodicarbonamide, 4 parts by weight of divinylbenzene, and 0.8 parts by weight of dicumyl peroxide to the melt, the mixture was kneaded for about 5 minutes. The kneaded mixture was cut into chips, placed in a closed vessel, and heated for about 6 minutes on a press heated to 230° C., under a pressure of 200 kg./sq. cm. to conduct crosslinking polypropylene and decomposing foam agent simultaneously. Finally, when the gauge pressure was reduced to 0 kg./sq. cm., and the press was opened, the polypropylene foamed instantly to provide a fine-cellular polypropylene resin foam having an aparent specific gravity of 0.035 and a uniform cell diameter (80–120µ) system. The degree of crosslinking of the foam was 72.0 (percent by weight).

EXAMPLE 3

A uniform mixture of 100 parts by weight of powdered polypropylene (having an intrinsic viscosity of 3.01) having an isotacticity of 94, 10 parts by weight of bisbenzene-sulfonyl hydrazide, 5 parts by weight of divinylbenzene, and 0.8 parts of dicumyl peroxide was heated for about 10 minutes on a press heated to 240–250° C., under a pressure of 200 kg./sq. cm. Thereafter, the pressure applied was released, when the polypropylene foamed to provide a fine-cellular foamed body having an apparent specific gravity of 0.044 and uniform cell size (cell diameter 100–120µ).

The degree of crosslinking (by weight) of the polypropylene resin foam was 68.8

For confirming the merit of this invention illustrated in the above example, the following experiment was conducted.

That is, the same mixture as in Example 3 was heated on the press heated to 170° C. for 15 minutes. In this case, however, the foaming agent was not decomposed and hence a non-foamed crosslinked polymer sheet was obtained. The sheet was placed in a salt bath heated to 260° C., under normal pressure to cause foams but the gases formed by the decomposition of the foaming agent flew off vigorously owing to the insufficient crosslinking of the polymer. Thus, the apparent specific gravity of the foamed body thus obtained was only 0.515 and the cell sizes of foams were uneven on the whole. The degree of crosslinking of the foam was only 27.5.

EXAMPLE 4

The same dry mixture as in Example 3 was heated on a press heated to 215° C., as in the same example. In this case, since the foaming agent was not decomposed, a non-foamed crosslinked polymer sheet was obtained. When the sheet was placed in a salt bath heated to 260° C., under normal pressure, the polypropylene foamed to provide a polypropylene resin foam having an apparent specific gravity of 0.056 and a fine cell size (cell diameter: 200–300µ). The degree of crosslinking (by weight) of the foam was 67.3.

EXAMPLE 5

A mixture of 100 parts by weight of powdered ethylene-propylene block copolymer (content of ethylene 15% by weight, intrinsic viscosity 3.40, and softening point 168° C.), having an isotactic degree of 85, 10 parts by weight of azodicarbonamide, 0.8 part by weight of dicumyl peroxide, and 1.0 part by weight of divinylbenzene was heated for about 10 minutes on a press heated to 185° C., under a pressure of about 150 kg./sq. cm. to provide a non-foamed crosslinked polymer sheet. The sheet was then heated for about 5 minutes in a silicone oil to 235° C., to cause foams therein and then the silicone oil on the sheet was washed out by acetone to provide a white foamed body having an apparent specific gravity of 0.081 and uniform cell size (cel diameter 300–400µ).

EXAMPLE 6

A uniform mixture of 100 parts by weight of powdered polypropylene (intrinsic viscosity of 2.50 and softening point of 170° C.) containing about 5% by weight ethylene and having an isotacticity of 89, 5 parts by weight of azodicarbonamide, 0.5 parts by weight of dicumyl peroxide, and 4 parts by weight of divinylbenzene was heated for about 7 minutes on a press heated to 183° C. under a pressure of 100 kg./sq. cm. to provide a non-foamed crosslinked sheet. The sheet thus obtained was heated for about 5 minutes on a salt bath of 230° C., to cause foams and to provide a fine cellular foam having an apparent specific gravity of 0.096 and uniform cell size (cell diameter 200–300µ). The degree of crosslinking of the foamed polymer was 7.08 (percent by weight).

EXAMPLE 7

A mixture of 100 parts by weight of powdered polypropylene having an isotacticity of 94, and softening point of 170° C., 50 parts by weight of powdered ethylene vinyl-acetate copolymer (content of vinyl acetate 5% by weight) 10 parts by weight of dinitropentamethylene-etramine, 0.3 part by weight of 2,5-dimethyl-2,5-bis(t-butylperoxy)-hexene, and 6 parts by weight of divinylbenzene was pressed for about 10 minutes on a press heated to 185° C., under a pressure of 100 kg./sq. cm. to provide a non-foamed crosslinked polymer sheet. Thereafter, the sheet thus obtained was foamed for about 3 minutes in a silicone bath heater to 220° C., and the silicone on the sheet was washed out by acetone to provide a white fine-cellular polypropylene resin foam having an apparent specific gravity of 0.062.

For confirming the process of this invention illustrated in the example, the following comparative experiment was conducted.

That is, a uniform mixture of 100 parts by weight of powdered polypropylene (intrinsic viscosity of 3.20 and softening point 175° C.) having an isotacticity of 94, 50 parts by weight of powdered ethylene vinyl acetate copolymer (content of vinyl acetate 5% by weight) 10 parts by weight of barium azodicarboxylate, 0.5 part by weight of dicumyl peroxide, and 3 parts by weight of divinyl benzene was subjected to a crosslinking reaction for about 6 minutes on a press heated to 187° C. under a pressure of about 100 kg./sq. cm., and the sheet thus obtained was found in a silicone bath heated to 265° C. In this case, however, the cell size of the foams thus formed were large and uneven and the foaming ratio was about ½ to ⅓ of the foaming ratio theoretically calculated from the additional amount of the foaming agent. This is because the barium azodicarboxylate decomposes gradually without satisfying the conditions of the foaming agent, which reduces remarkably the foaming ratio multiplied by the bad inclusive property of the generated gases by polypropylene.

EXAMPLE 8

A dry mixture of 100 parts by weight of powdered polypropylene (having an intrinsic viscosity of 1.95 and a softening point of 175° C. and grain sizes of less than 42 meshes including 63% by weight of powders having from 42 to 150 meshes) having an isotacticity of 95, 10 parts by weight azodicarbonamide, 1.0 part by weight of dicumyl peroxide, and 1.0 part by weight of divinylbenzene was prepared by grinding in a mortar azodicarbonamide and dicumyl peroxide into less than about 60 meshes, adding thereto powdered polypropylene, and adding finally divinylbenzene to them followed by stirring sufficiently for dispersing uniformly the foaming agent, the organic peroxide and divinylbenzene. The mixture was placed in a closed vessel having a rectangular cavity of 4 mm. in thickness, 60 mm. in length, and 30 mm. in width and the mixture was pressed in the cavity by a press heated to 215–220° C., in a vertical direction under a pressure of 100 kg./sq. cm. in gauge. Thereafter the pressure was released rapidly from the pressed mold, when polypropylene foamed instantly to provide a fine-cellular polypropylene resin foam having an apparent specific gravity of 0.050 and uniform cell size (50–100μ:cell diameter).

EXAMPLE 9

A mixture of 100 parts by weight of polypropylene powders having an isotacticity of 95 (same as in Example 8), 10 parts by weight of dinitropentamethylenetetramine, 0.8 part by weight of divinylbenzene, and 0.5 part by weight of di-t-butyl-pertetrephthalate was mixed for 5 minutes by means of a Henscher mixer of about 2000 r.p.m., and then subjected to foaming under pressure as in Example 8 to provide a fine-cellular uniformly foam (cell diameter:50–150μ) having an apparent specific gravity of 0.062 and also uneven cells were not observed on the surface of the foamed polymer.

EXAMPLE 10

A mixture of 100 parts by weight of crystalline polypropylene having an isotacticity of 95 and an intrinsic viscosity of 3.5, 10 parts by weight of azodicarbonamide, and 1.7 parts by weight of divinylbenzene was kneaded thoroughly in a mixing roll at 180° C. and then fabricated into a sheet having 2 mm. in thickness. After irradiating the both surfaces of the sheet with 4 M rad. electron rays from Van de Graaff accelerator at 25° C., the sheet was foamed in a silicone bath heated to 220° C. to provide a white closed-cellular polypropylene resin foam. The apparent specific density of the foam was 0.035 and the degree of crosslinking thereof was 70%.

EXAMPLE 11

After irradiating the sheet with electron rays from the Van der Graaff accelerator as in Example 10, the sheet was placed in a closed vessel of 2 mm. in thickness and pressed and heated by a press mold heated to 210° C. for 3 minutes under 100 kg./sq. cm. in gauge. Then, when the pressure in the mold was released suddenly, a white fine closed-cellular polypropylene (cell diameter:50–100μ) resin foam was obtained. The apparent specific gravity of the foam was 0.04.

EXAMPLE 12

A mixture of 80 parts by weight of crystalline polypropylene having an isotacticity of higher than 95, 20 parts by weight of an ethylene-vinyl acetate copolymer ("Evaflex"—trade name) 10 parts by weight of azodicarbonamide, and 1.7 parts by weight of divinylbenzene was kneaded thoroughly and fabricated into a sheet of 3 mm. in thickness. After irradiating both surfaces of the sheet with 5 M rad. electron rays from Van de Graaff accelerator at 60° C., the sheet was foamed in a silicone bath heated to 220° C. to provide a white closed-cellular (cell diameter:150–250μ) polypropylene resin foam. The apparent specific gravity of the foam was 0.05 and the degree of crosslinking thereof was 75%. Apart from this, the crosslinked sheet having the same composition was placed in a closed vessel and heated to 210° C., under pressure to provide a foam having uniform cell having the average size of 50μ.

EXAMPLE 13

A mixture of 1000 parts by weight of crystalline polypropylene ([η]=3.0) having an isotacticity of 95, 200 parts by weight of p-toluenesulfonyl semicarbozide, and 50 parts by weight of divinylbenzene phthalate was mixed in a Henscher mixer and fabricated into a sheet of 1.5 mm. in thickness by means of an extruder. After irradiating both surfaces of the sheet with 6 M rad. electron rays of an electron rays of an electron accelerator EBG by General Electric Co. at 50° C., the sheet was directly heated and foamed in a salt bath heated to 220° C. to provide a foam having uniform cell (cell diameter 300–350μ). The apparent specific gravity of the foamed product was 0.04 and the degree of crosslinking thereof was 68.5%.

EXAMPLE 14

A mixture of 80 parts by weight of polypropylene (MI=0.3) having an isotacticity of 96, 20 parts by weight of a polybutadiene, 15 parts by weight of azodicarbonamide, and 2 parts by weight of divinylbenzene was mixed in a mixing roll an fabricated into a sheet of 3 mm. in thickness. Both surfaces of the sheet was irradiated with electon rays of 4 M rad. By means of Van de Graaff accelerator to cause crosslinking at 25° C. Thereafter, the sheet was placed in a closed vessel and heated to 210° C., by means of a hot press to provide a flexible foamed product having fine cell (cell diameter: 50–100μ). The apparent specific gravity and the degree of crosslinking thereof were 0.03 and 73.8% respectively.

EXAMPLE 15

A mixture of 16000 parts by weight of crystalline polypropylene powders ([η]=24) having an isotacticity of 95, 4000 parts by weight of an ethylene-vinyl acetate copolymer (content of vinyl acetate 5%), 2000 parts by weight of azodicarbonamide, 600 parts by weight of divinylbenzene, 1000 parts by weight of ethylvinylbenzene, and 60 parts by weight of a stabilizer were dry-blended by means of a Henscher mixer and then fabricated into a sheet of 400 mm. in width and 2.5 mm. in thickness by means of a 65 mm. extruder. After crosslinking the sheet by irradiating it with 4 M rad. electron rays from Van de Graaff accelerator at 25° C., the sheet was continuously foamed on a salt bath heated at 230° C., and on a foaming bath heated by infrared rays to provide a white continuous foamed sheet of 5 mm. in thickness having uniform cell of 200µ in average size. The apparent specific gravity and the degree of crosslinking thereof were 0.04 g./cm.$^3$ and 63% respectively. Also, apart from this, the irradiated sheet having the same composition was cut into a sheet of 250 x 250 m. The sheet was heated under pressure for 10 minutes in a closed vessel having the same capacity at a gauge pressure of 200 kg./sq. cm., and the pressure was released suddenly to foam the sheet simultaneously to provide a polypropylene resin foam having a closed cellular percentage of higher than 95% and uniform cell having an average foam diameter of less than 100µ. The apparent density and the degree of crosslinking of the foam were 0.043 g./cm.$^3$ and 65% respectively. The surface of the sliced section of the foam was very beautiful and the moldability thereof in vacuo was very good.

EXAMPLE 16

A mixture of 20,000 parts by weight of polypropylene powders ($[\eta]=2.3$) having an isotacticity of higher than 95, 100 parts by weight of azodicarbonamide, 2000 parts by weight of divinylbenzene having 56% in purity, and 60 parts by weight of a stabilizer was dry-blended by means of a Henscher mixer, and then fabricated into a continuous sheet of 400 mm. in width and 2 mm. in thickness. After irradiating both surfaces of the sheet with 5 M rad. electron rays of an electron ray accelerator at 25° C., each, the sheet was heated through a foaming bath heated to 230° C., to provide a white foamed continuous sheet of 3.5 mm. in thickness having a closed-cellular percentage of higher than 90% and an average cell diameter of less than 150µ. The apparent density and the degree of crosslinking thereof were 0.08 g./cm.$^3$ and 67.5% respectively.

EXAMPLE 17

A mixture of 10,000 parts by weight of polypropylene ($[\eta]=3.0$) having an isotacticity of higher than 95,500 parts by weight of p-toluenesulfonylsemicarbazide, 300 parts by weight of divinylbenzene, 500 parts by weight of vinyltoluene, and 30 parts by weight of a stabilizer was mixed by means of a Henscher mixer and fabricated into a sheet of 3 mm. in thickness by an extruder. After irradiating both surfaces of the sheet with 4 M rad. electron rays by a Van de Graaff type electron accelerator at 25° C. each, the sheet was heated at 260° C. in a foaming bath to provide a continuous foamed sheet having a closed-cellular percentage of higher than 85% and containing uniform foams having an average cell diameter of less than 100µ. The apparent density and the crosslinking degree thereof were 0.1 g./cm.$^3$ and 63.8% respectively.

EXAMPLE 18

A mixture of 16,000 parts by weight of polypropylene ($[\eta]=24$) having an isotacticity of higher than 95. 4,000 parts by weight of high-pressure method polyethylene (MI=3–4) powders, 3,000 parts by weight of azodicarbonamide, 1,000 parts by weight of divinylbenzene, and 50 parts by weight of a stabilizer was mixed in a Henscher mixer and fabricated into a sheet of 400 mm. in width and 25 mm. in thickness. After irradiating both surfaces of it with 4 M rad. electron rays of an electron accelerator made by General Electric Co., at 25° C., each, the sheet was foamed at a normal pressure in a foaming bath heated to 230° C., to provide a continuous foamed sheet of 5.8 mm. in thickness having a closed-cellular percentage of higher than 92% and containing uniform foams having an average cell diameter of 250–350µ. The apparent density and the degree of crosslinking thereof were 0.023 g./cm.$^3$ and 64.3% respectively. The polypropylene foam sheet was more excellent in compression hardness and bending strength as compared with polyethylene foam.

What is claimed is:
1. A method of preparing a polypropylene resin foam which comprises
   heating mixture of an isotactic polypropylene illustrating a degree of isoactivity of at least 60%, divinylbenzene, an organic radical forming agent selected from the group consisting of organic peroxides, azo compounds and organic disulfide compounds, and a foaming agent, the amount of said divinylbenzene being from about 0.05–about 20% by weight based on the weight of polypropylene, to conduct the cross-linking reaction of said polypropylene to a degree of cross-linking of the polypropylene within the range of from about 5 to about 90%, without foaming said polypropylene, and
   subsequent to said cross-linking reaction, foaming the polypropylene.
2. The method as claimed in claim 1 wherein the average foam cell diameter thereof is from 10 to 800µ, and the density thereof is from 0.5 to 0.01 gm./cm.$^3$.
3. The method as claimed in claim 1 wherein the isotacticity of said polypropylene is higher than 60% and the intrinsic viscosity of said polypropylene in tetralin at 135° C., is from 0.5 to 15.0.
4. The method as claimed in claim 1 wherein said organic radical foaming agent is an organic peroxide having the decomposition temperature of which half value period is one minute thereof is higher than 120° C.
5. The method as claimed in claim 1 wherein the amount of said organic radical forming agent is from 0.01 to 10% by weight based on the weight of the polypropylene.
6. The method as claimed in claim 1 wherein said organic radical forming agent is selected from dicumyl peroxide, cumylhydro peroxide, 2,5-dimethyl-2,5-bis(t-butylperoxy)hexane, di-t-butyl perterephthalate, methylethylketone perterephthalate, and 2,4-dimethyl-2,4-bis(t-butylperoxy)hexane.
7. The method as claimed in claim 1 wherein said foaming agent is a chemical foaming agent having adecomposition temperature of higher than 140° C.
8. The method as claimed in claim 1 wherein said foaming agent is selected from dimitropentamethylenetetramine, azodicarbonamide, barium azodicarboxylate, and disbenzenenesulfonyl hydrazide.
9. The method as claim in claim 1 wherein the amount of said foaming agent is from 0.1 to 30% by weight based on the weight of the polypropylene.
10. The method as claimed in claim 1 wherein said crosslinking and foaming are conducted under a pressure lower than 2000 kg./sq. cm.
11. The method as claimed in claim 1 wherein said crosslinking and foaming are conducted at a temperature of from the softening point of polymer to 350° C.
12. A method of preparing a polypropylene foam which comprises.
   irradiating a mixture of isotatic polypropylene illustrating a degree of isotactivity of at least 60%, divinylbenzene, and a foaming agent, the amount of said divinylbenzene being from about 0.05 to about 20% by weight based on the weight of polypropylene, with high energy rays at a temperature of lower than the softening point of said polypropylene, whereby the degree of cross-linking of said polypropylene is between about 5 and about 90% without foaming said polypropylene, and
   thereafter heating the mixture to a temperature higher than the softening point of the polypropylene and higher than the gas-generating temperature of said foaming agent, whereby the generation of foam is initiated.

13. The methods as claimed in claim 12 wherein said high energy rays are irradiation rays and the foaming temperature is from 200° C., to 260° C.

14. The method as claimed in claim 12 wherein the average foam cell diameter thereof is from 10 to 800μ, and the density thereof is from 0.5 to 0.01 g./cm.³.

15. The method as claimed in claim 12 wherein the isotactic degree of said polypropylene is higher than 60% and the intrinsic viscosity of said polypropylene in tetralin at 135° C., is from 0.5 to 15.0.

16. The proces of claim 1 wherein said organic radical forming agent comprises at least one member selected from the group consisting of an organic peroxide, an azo compound and an organic disulfide compound.

17. The process of claim 12 wherein said organic radical forming agent comprises at least one member selected from the group consisting of an organic peroxide, an azo compound and an organic disulfide compound.

References Cited
UNITED STATES PATENTS

| | | |
|---|---|---|
| 3,413,244 | 11/1968 | Landler et al. _____ 260—2.5 |
| 3,098,831 | 7/1963 | Carr. |
| 3,098,832 | 7/1963 | Pooley et al. |
| 3,250,731 | 5/1966 | Buhl et al. |

MURRAY TILLMAN, Primary Examiner

M. FOELAK, Assistant Examiner

U.S. Cl. X.R.

260—4, 88.2, 94.9, 878, 889, 897